United States Patent
Grokop et al.

(10) Patent No.: US 9,594,411 B2
(45) Date of Patent: Mar. 14, 2017

(54) DYNAMIC POWER MANAGEMENT OF CONTEXT AWARE SERVICES

(71) Applicant: QUALCOMM Incorporated, San Diego, CA (US)

(72) Inventors: Leonard Henry Grokop, San Diego, CA (US); Shankar Sadasivam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 13/780,815

(22) Filed: Feb. 28, 2013

(65) Prior Publication Data
US 2014/0245033 A1    Aug. 28, 2014

(51) Int. Cl.
| | |
|---|---|
| G06F 1/26 | (2006.01) |
| G06F 1/32 | (2006.01) |
| H04M 1/725 | (2006.01) |

(52) U.S. Cl.
CPC .............. *G06F 1/26* (2013.01); *G06F 1/3206* (2013.01); *G06F 1/3234* (2013.01); *H04M 1/72569* (2013.01)

(58) Field of Classification Search
CPC .................. G06F 1/32; G06F 1/26; G06F 1/16
USPC .................................................. 713/300, 340
See application file for complete search history.

(56) References Cited

U.S. PATENT DOCUMENTS

| | | | |
|---|---|---|---|
| 7,281,146 B2 | 10/2007 | Nalawadi et al. | |
| 8,046,600 B2 | 10/2011 | Holle et al. | |
| 8,180,583 B1 * | 5/2012 | Gossweiler | ........... G06F 1/3231 |
| | | | 702/62 |
| 8,301,913 B2 | 10/2012 | Diab et al. | |

(Continued)

FOREIGN PATENT DOCUMENTS

| | | |
|---|---|---|
| CN | 101071328 A | 11/2007 |
| CN | 101414269 A | 4/2009 |
| CN | 102448123 A | 5/2012 |

OTHER PUBLICATIONS

ISCI, et al., "An Analysis of Efficient Multi-Core Global Power Management Policies:Maximizing Performance for a Given Power Budget", Microarcitecture, MICRO-39. 39th Annual IEEE/ACM International Symposium, 2006, pp. 347-358.

(Continued)

*Primary Examiner* — Phil Nguyen
(74) *Attorney, Agent, or Firm* — Muncy, Geissler, Olds & Lowe, P.C.

(57) ABSTRACT

The disclosure is directed to modifying the operation of one or more hardware subsystems when a new context awareness service begins. An aspect determines a power budget for a plurality of operating context awareness services including the new context awareness service, wherein the power budget is based on a power requirement for each of the plurality of context awareness services, and wherein the power requirement for each of the plurality of context awareness services is based on power utilizations of the one or more hardware subsystems corresponding to the plurality (Continued)

of context awareness services, and allocates power resources to the one or more hardware subsystems based on importances of the plurality of context awareness services and/or the one or more hardware subsystems, wherein the allocation of the power resources is performed within the power budget.

39 Claims, 7 Drawing Sheets

(56) References Cited

U.S. PATENT DOCUMENTS

| | | | | |
|---|---|---|---|---|
| 8,391,830 | B1* | 3/2013 | Puliatti et al. | 455/404.1 |
| 8,655,307 | B1* | 2/2014 | Walker et al. | 455/405 |
| 2005/0219120 | A1* | 10/2005 | Chang | 342/357.13 |
| 2006/0053311 | A1* | 3/2006 | Chary | 713/300 |
| 2006/0280161 | A1* | 12/2006 | Liu | H04L 41/0816 370/351 |
| 2007/0100480 | A1* | 5/2007 | Sinclair et al. | 700/48 |
| 2008/0165714 | A1* | 7/2008 | Dettinger et al. | 370/311 |
| 2008/0248789 | A1 | 10/2008 | Song et al. | |
| 2008/0250415 | A1 | 10/2008 | Illikkal et al. | |
| 2008/0268828 | A1* | 10/2008 | Nagaraja | 455/419 |
| 2009/0055132 | A1* | 2/2009 | Cheng et al. | 702/187 |
| 2009/0109230 | A1* | 4/2009 | Miller | G06F 1/3203 345/506 |
| 2009/0228726 | A1* | 9/2009 | Malik et al. | 713/320 |
| 2010/0235654 | A1* | 9/2010 | Malik et al. | 713/300 |
| 2011/0014933 | A1* | 1/2011 | Karmarkar et al. | 455/466 |
| 2012/0165047 | A1* | 6/2012 | Dolenc | 455/466 |
| 2012/0221884 | A1 | 8/2012 | Carter et al. | |
| 2012/0233475 | A1 | 9/2012 | Yokoyama | |
| 2012/0315843 | A1* | 12/2012 | Cox | 455/41.1 |
| 2012/0324259 | A1* | 12/2012 | Aasheim et al. | 713/320 |
| 2013/0103212 | A1* | 4/2013 | Andiappan | 700/286 |
| 2014/0181536 | A1* | 6/2014 | Naffziger et al. | 713/300 |
| 2014/0324745 | A1* | 10/2014 | Leppanen et al. | 706/12 |

OTHER PUBLICATIONS

Cardone G., et al., "MSF: An Efficient Mobile Phone Sensing Framework", International Journal of Distributed Sensor Networks, vol. 50, No. 4, Jan. 30, 2013 (Jan. 30, 2013), pp. 1-9, XP055114326, ISSN: 1550-1329, DOI: 10.1109/MCOM.2010.5560598.

International Search Report and Written Opinion—PCT/US2014/018704—ISAEPO—Apr. 25, 2014.

Lane N.D., et al., "A survey of mobile phone sensing", IEEE Communications Magazine, Sep. 1, 2010, vol. 48, No. 9, IEEE Service Center, Piscataway, US, pp. 140-150, XP011317499, ISSN: 0163-6804.

Lee Y., et al., "MobiCon: A Mobile Context-Monitoring Platform", Communications of the ACM, vol. 55, No. 3, Mar. 1, 2012 (Mar. 1, 2012), pp. 54-65, XP055114397, ISSN: 0001-0782, DOI:10.1145/2093548.2093567.

Wang Y., et al., "A framework of energy efficient mobile sensing for automatic user state recognition", Proceedings of the 7th International Conference on Mobile Systems, Applications, and Services, MOBISYS 109, Jun. 22, 2009 (Jun. 22, 2009)-Jun. 25, 2009 (Jun. 25, 2009), pp. 179-192, XP055017031, New York, New York, USA DOI: 10.1145/1555816.1555835, ISBN: 978-1-60-558566-6.

* cited by examiner

FIG. 7

DYNAMIC POWER MANAGEMENT OF CONTEXT AWARE SERVICES

BACKGROUND OF THE INVENTION

1. Field of the Invention

The disclosure is directed to dynamic power management of context aware services.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

Certain types of user equipments (UEs), such as smart phones, tablet computers, and the like, are built on a mobile operating system and can download and install third-party applications (a.k.a. "apps"). These UEs have a number of hardware subsystems that can be accessed by installed applications to provide features and functionality to a user.

Multiple applications, residing above the operating system level, may wish to simultaneously leverage multiple context awareness services, residing below the operating system level. This can impact power consumption. Examples of such services include geo-fencing, place clustering, audio environment clustering, target sound detection (e.g. speech, typing), motion state and device position classification, proximity discovery, target situation detection (e.g. driving, in meeting, alone, sleeping, etc.), and the like.

In many cases, the performance of a context awareness service degrades gradually when the power allocated to it is reduced. For example, the performance of a speech detector or an audio clustering algorithm operating on duty-cycled audio data degrades gracefully when the duty-cycle is reduced. This suggests that rather than allowing power consumption to increase with each new service, or arbitrarily killing services, the power allocated should simply be adjusted to satisfy the constraints of a power budget.

SUMMARY

The disclosure is directed to modifying the operation of one or more hardware subsystems when a new context awareness service begins. A method for modifying the operation of one or more hardware subsystems when a new context awareness service begins includes determining a power budget for a plurality of operating context awareness services including the new context awareness service, wherein the power budget is based on a power requirement for each of the plurality of context awareness services, and wherein the power requirement for each of the plurality of context awareness services is based on power utilizations of the one or more hardware subsystems corresponding to the plurality of context awareness services, and allocating power resources to the one or more hardware subsystems based on importances of the plurality of context awareness services and/or the one or more hardware subsystems, wherein the allocation of the power resources is performed within the power budget.

An apparatus for modifying the operation of one or more hardware subsystems when a new context awareness service begins includes logic configured to determine a power budget for a plurality of operating context awareness services including the new context awareness service, wherein the power budget is based on a power requirement for each of the plurality of context awareness services, and wherein the power requirement for each of the plurality of context awareness services is based on power utilizations of the one or more hardware subsystems corresponding to the plurality of context awareness services, and logic configured to allocate power resources to the one or more hardware subsystems based on importances of the plurality of context awareness services and/or the one or more hardware subsystems, wherein the allocation of the power resources is performed within the power budget.

An apparatus for modifying the operation of one or more hardware subsystems when a new context awareness service begins includes means for determining a power budget for a plurality of operating context awareness services including the new context awareness service, wherein the power budget is based on a power requirement for each of the plurality of context awareness services, and wherein the power requirement for each of the plurality of context awareness services is based on power utilizations of the one or more hardware subsystems corresponding to the plurality of context awareness services, and means for allocating power resources to the one or more hardware subsystems based on importances of the plurality of context awareness services and/or the one or more hardware subsystems, wherein the allocation of the power resources is performed within the power budget.

A non-transitory computer-readable medium comprising program code for modifying the operation of one or more hardware subsystems when a new context awareness service begins includes at least one instruction to determine a power budget for a plurality of operating context awareness services including the new context awareness service, wherein the power budget is based on a power requirement for each of the plurality of context awareness services, and wherein the power requirement for each of the plurality of context awareness services is based on power utilizations of the one or more hardware subsystems corresponding to the plurality of context awareness services, and at least one instruction to allocate power resources to the one or more hardware subsystems based on importances of the plurality of context awareness services and/or the one or more hardware subsystems, wherein the allocation of the power resources is performed within the power budget.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
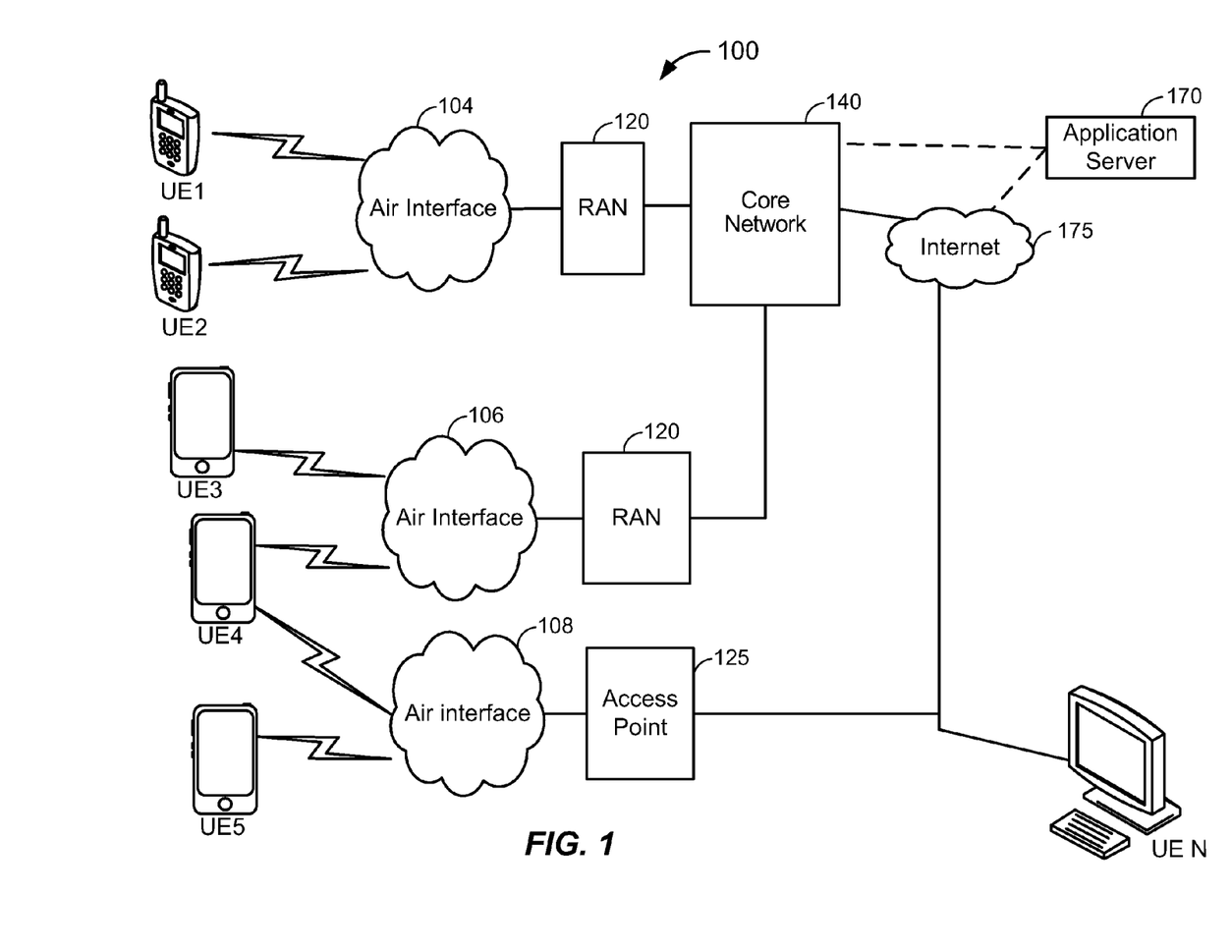
FIG. 1 illustrates a high-level system architecture of a wireless communications system in accordance with an aspect of the disclosure.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System of Mobile Communication (GSM), Enhanced Data rates for GSM Evolution (EDGE), Wideband CDMA (W-CDMA), Long-Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 2:
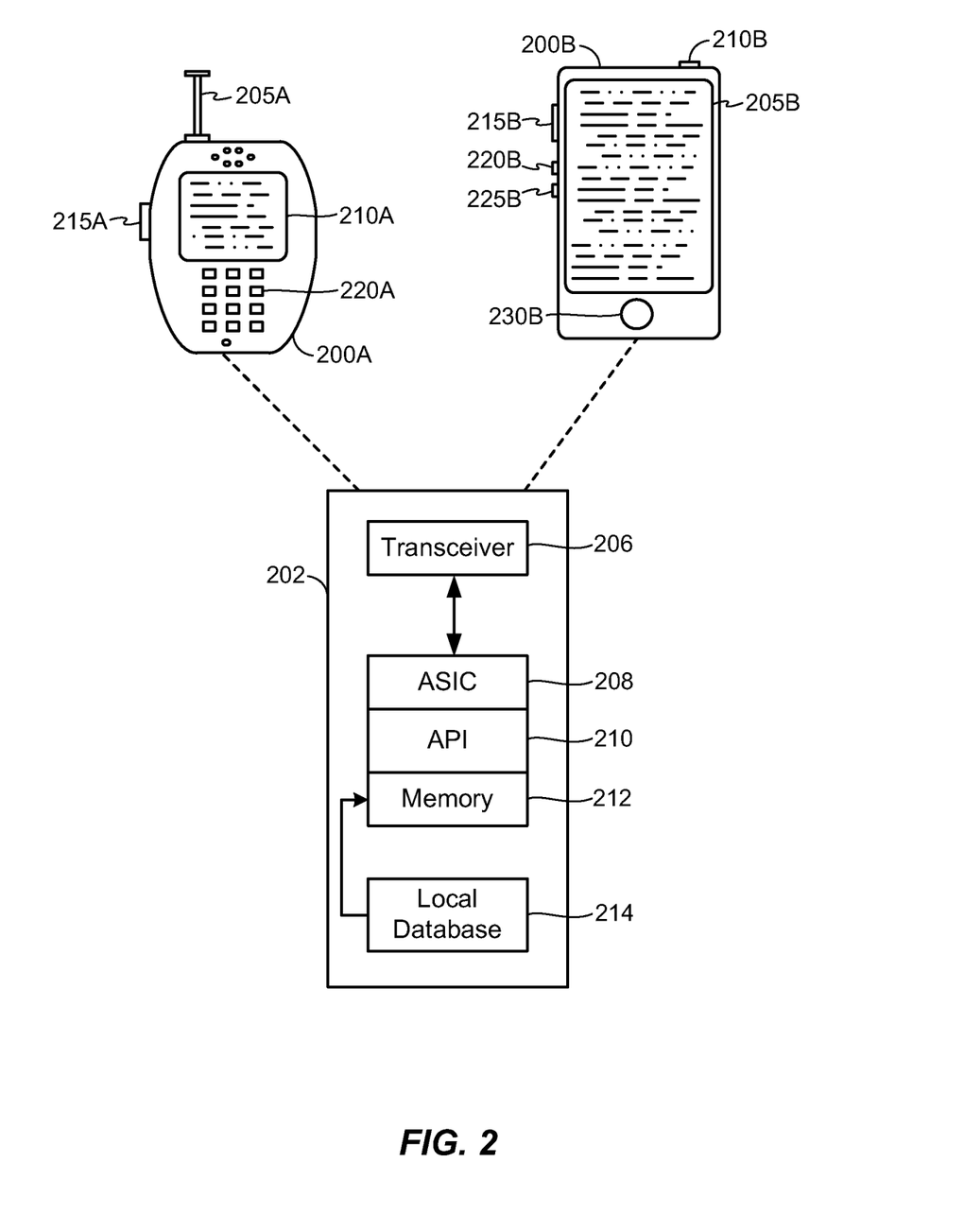
FIG. 2 illustrates examples of user equipments (UEs) in accordance with aspects of the disclosure.

FIG. 2 illustrates examples of UEs in accordance with aspects of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only memory (ROM) or random-access memory (RAM), electrically erasable programmable ROM (EEPROM), flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 3:
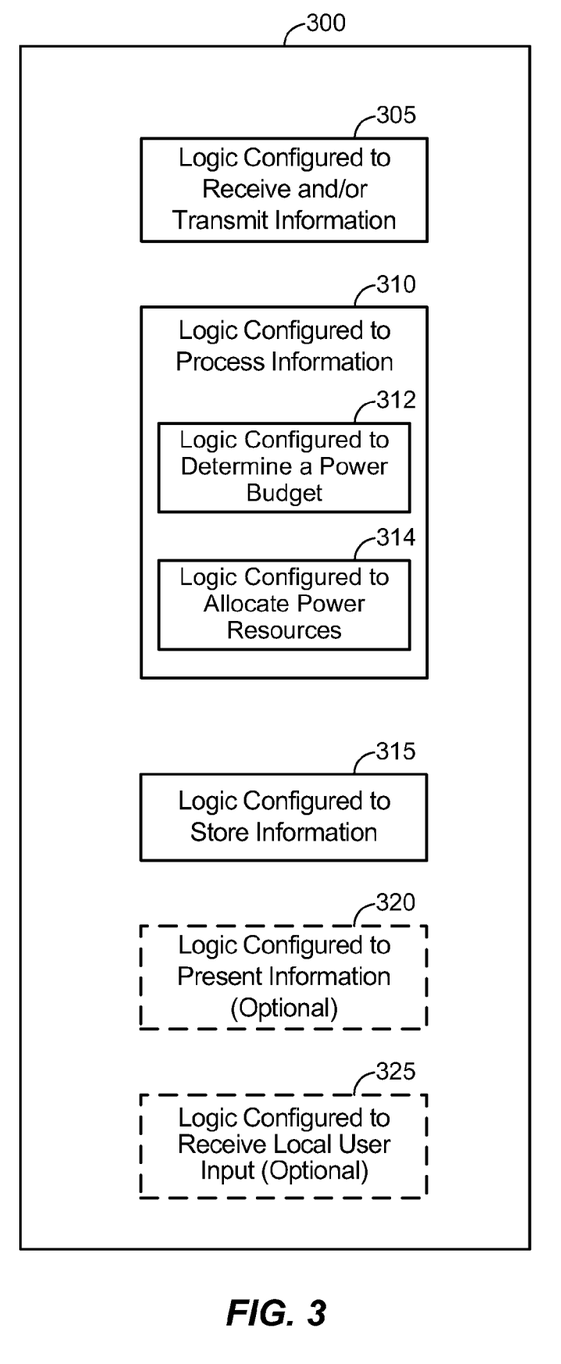
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information may also include logic configured to determine a power budget 312 and logic configured to allocate power resources 314. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Certain types of UEs, such as smart phones, tablet computers, and the like, are built on a mobile operating system and can download and install third-party applications (a.k.a. "apps"). These UEs have a number of hardware subsystems that can be accessed by installed applications to provide features and functionality to a user.

Multiple applications, residing above the operating system level, may wish to simultaneously leverage multiple context awareness services, residing below the operating system level. This can impact power consumption. Examples of such services include geo-fencing, place clustering, audio environment clustering, target sound detection (e.g. speech, typing), motion state and device position classification, proximity discovery, target situation detection (e.g. driving, in meeting, alone, sleeping, etc.), and the like.

In many cases, the performance of a context awareness service degrades gradually when the power allocated to it is reduced. For example, the performance of a speech detector or an audio clustering algorithm operating on duty-cycled audio data degrades gracefully when the duty-cycle is reduced. This suggests that rather than allowing power consumption to increase with each new service, or arbitrarily killing services, the power allocated should simply be adjusted to satisfy the constraints of a power budget.

Accordingly, the disclosure provides for dynamic power management of context awareness services. At the highest level, this involves adjusting the power allocated to each context awareness service currently running when an application (new or otherwise) requests a new context awareness service to begin. The power allocation can be adjusted such that a total power budget is never exceeded. This may involve a flat power allocation, i.e. allocating the same amount of power to each context aware service, or a dynamic power allocation, i.e. allocating different amounts of power to each context aware service based on priority.

Figure 4:
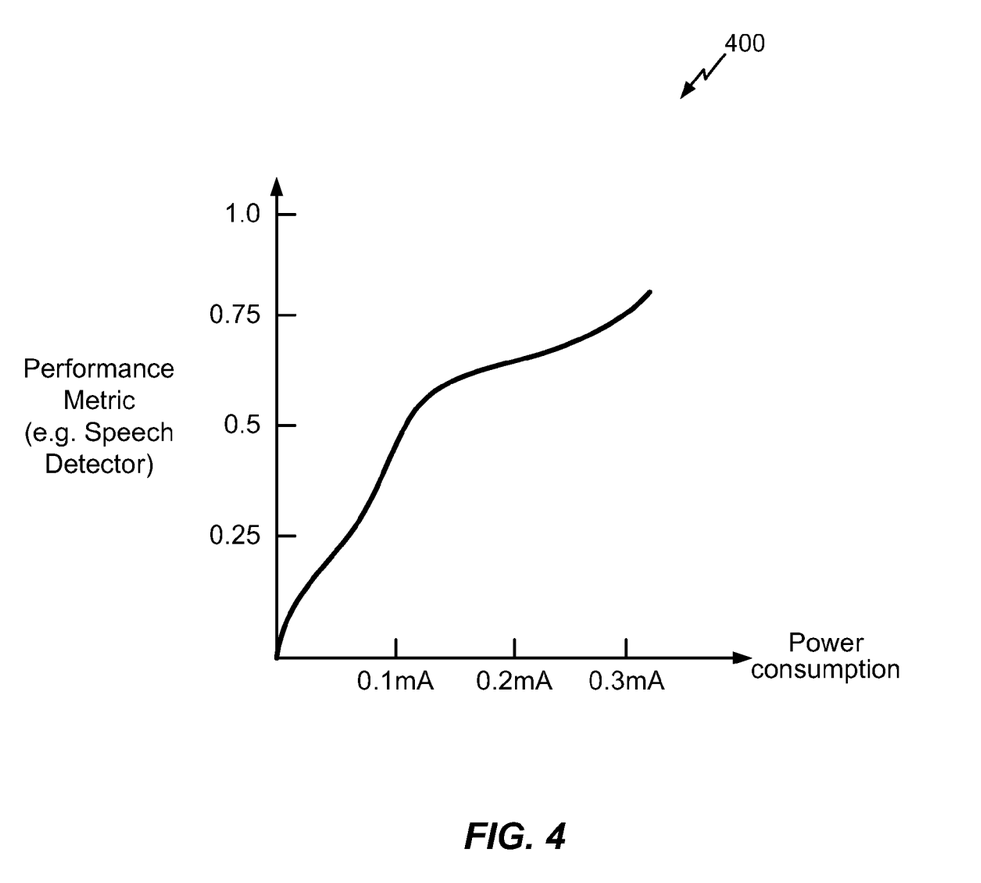
FIG. 4 illustrates an exemplary power/performance graph for a speech detector context awareness service.

Each context awareness service may have a power/performance tradeoff. That is, as power decreases, performance decreases, and as power increases, performance increases. FIG. 4 illustrates an exemplary power/performance graph 400 for a speech detector context awareness service. Here, the performance metric may be the accuracy of the speech detector, that is, whether it correctly identifies whether or not the user is speaking. The speech detector may operate by sampling small snippets of speech with some duty cycle and making a decision every minute, for example, as to whether or not speech is present in the audio stream. By increasing the duty cycle, the performance improves at the cost of increased power consumption. The power/performance tradeoff of each service can be taken into consideration when computing the power budget.

A utility function can be used to map the performance metrics of all running context awareness services to a single metric that can be optimized. If the performance metric of the ith service is denoted $f_i(r_i)$ as a function of the power allocated to the ith service the utility function takes the form $$U(r_1, r_2, \ldots) = g(f_1(r_1), f_2(r_2), \ldots).$$

For example, $$U(r_1, r_2, \ldots) = \sum_i \log(f_i(r_i)).$$

One can then find a power allocation $(r_1^*, r_2^*, \ldots)$ that maximizes the utility function subject to the constraint that the total power allocated not exceed some fixed threshold, i.e. $\Sigma_i r_i \leq R$. There are a plethora of methods that can be used to solve this problem. If the problem is convex, one approach is to use gradient descent.

A brute force approach using lookup tables can solve this problem without the need for such online optimization. This involves pre-determining/pre-computing a power allocation $(r_1^*, r_2^*, \ldots)$ for each possible subset of concurrent services. However, as the number of possible subsets grows very rapidly with the total number of possible services, this approach could be infeasible.

There can be multiple applications running, each utilizing a different subset (possibly overlapping) of context awareness services. If some services are utilized by a greater number of applications, it may be desirable to weight these services more heavily when computing a power allocation. One example of how to incorporate weightings in the utility function is $$U(r_1, r_2, \ldots) = \sum_i w_i \log(f_i(r_i))$$

where $w_i$ is the weighting of the ith service. A more heavily utilized service would be given a higher weighting.

Figure 5:
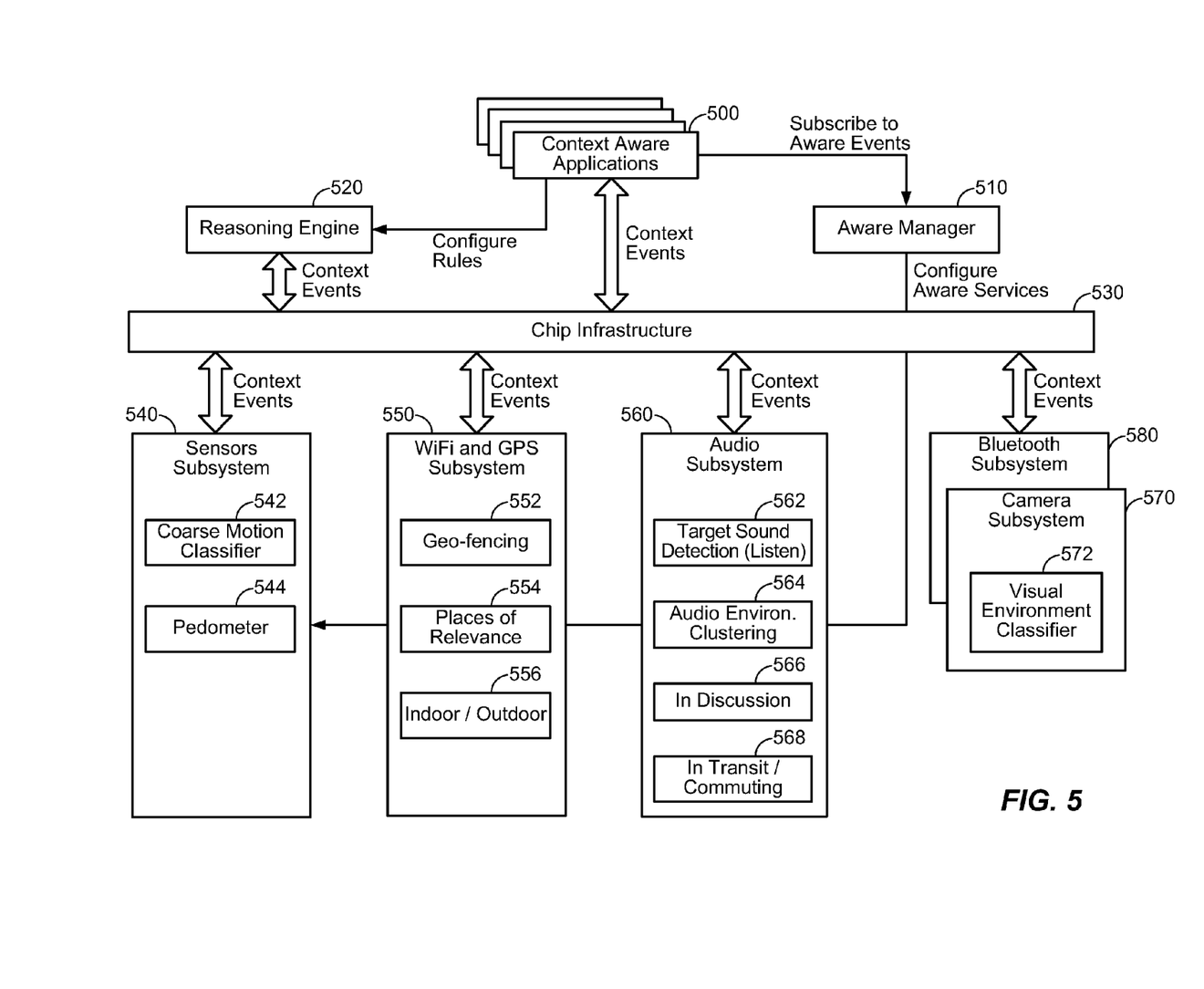
FIG. 5 illustrates an exemplary three-tier system comprising a context aware applications tier, a context awareness services tier, and a sensor subsystem tier.

FIG. 5 illustrates an exemplary three-tier system comprising a context aware applications tier, a context awareness services tier, and a sensor subsystem tier. The context aware applications tier is made up of the context aware applications 500. The context awareness services tier is made up of the context awareness services 542, 544, 552, 554, 556, 562, 564, 566, 568, and 572. The sensor subsystem tier is made up of subsystems 540, 550, 560, 570, and 580. As is apparent, these are merely examples of context awareness services and sensor subsystems, and the disclosure is not limited to these examples. Also, while FIG. 5 depicts four context aware applications 500, it is apparent that any number of applications may utilize the context awareness services and sensor subsystems.

The context aware applications 500 subscribe to aware events using an aware manager 510. The aware manager 510 configures the selected context awareness services on behalf of the context aware applications 500, in this case, the sensor subsystem 540, the WiFi and GPS subsystem 550, and the audio subsystem 560. The context aware applications 500 also create/configure the rules contained in a reasoning engine 520 that are applied to detected context events.

FIG. 5 illustrates five sensor subsystems associated with various context awareness services. A sensor subsystem 540 is associated with a coarse motion classifier 542 and a pedometer 544. A WiFi and GPS subsystem is associated with a geo-fencing service 552, a places of relevance service 554, and an indoor/outdoor classifier 556. An audio subsystem is associated with a target sound detection service 562, an audio environment clustering service 564, an in discussion service 566, and an in-transit/commuting service 568. A camera subsystem 570 is associated with a visual environment classifier service 572. There is also a Bluetooth subsystem 580.

The sensor subsystems 540, 550, 560, 570, and 580, the context aware applications 500, and the reasoning engine 520 communicate with each other regarding context events via the chip infrastructure 530.

When multiple context awareness services are running concurrently, the total power consumption may be unequal to the sum of the power consumptions of each service running in isolation. This phenomenon may result from low-level optimizations such as synchronized wake-up times for concurrent services. It may also result when different running context awareness services utilize shared sensor subsystems. For example, if an audio clustering service is running concurrently with a speech detection service, both services may access the same duty-cycled audio data stream. FIG. 5 illustrates an example of this. Specifically, sensor subsystems 540, 550, and 560 are each associated with multiple context awareness services.

This problem can be solved by performing power budget accounting at the level of sensor subsystems instead of at the level of context awareness services. This can be done by using a utility function derived from the three-tier system illustrated in FIG. 5. Each application may require multiple context awareness services to be running with each context awareness service utilizing multiple sensor subsystems. For example, one application may require geo-fencing and speech detection services, a second may require geo-fencing and in-meeting detection, a third may require in-meeting detection and audio clustering. Speech detection and audio clustering may utilize the audio subsystem, geo-fencing may utilize the GPS subsystem and the sensor subsystem, and the in-meeting detection may utilize the sensor subsystem and the audio subsystem.

Figure 6:
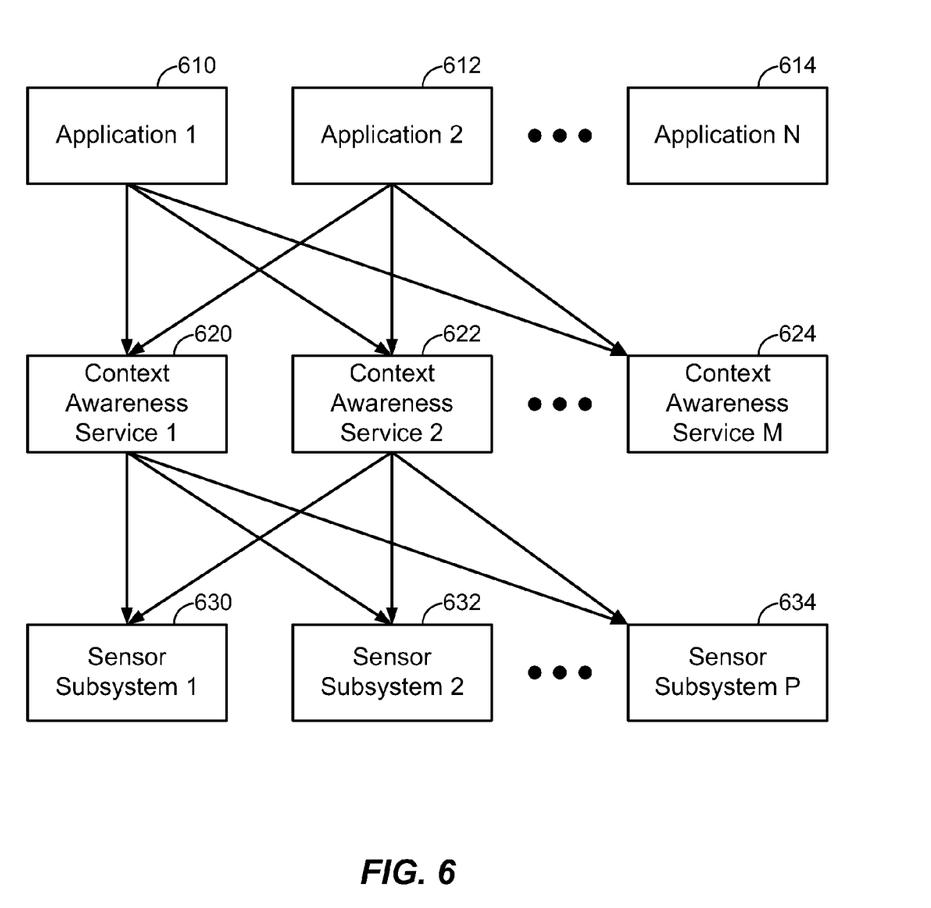
FIG. 6 illustrates an example of multiple applications using multiple context awareness services, which in turn use multiple sensor subsystems.

FIG. 6 illustrates an example of multiple (N) applications using multiple (M) context awareness services, which in turn use multiple (P) sensor subsystems. Specifically, an application 610 can utilize a first context awareness service 620, a second context awareness service 622, up to the Mth context awareness service 624. A second application 612 can also utilize the first context awareness service 620, the second context awareness service 622, up to the Mth context awareness service 624. There may be up to an Nth application 614. Although not illustrated, the Nth application 614 may also utilize one or more of the context awareness services 620, 622, and 624.

In turn, the first context awareness service 620 can utilize a first sensor subsystem 630, a second sensor subsystem 632, up to the Pth sensor subsystem 634. The second context awareness service 622 can also utilize the first sensor subsystem 630, the second sensor subsystem 632, up to the Pth sensor subsystem 634. Although not illustrated, the Mth content awareness service 624 may also utilize one or more of the sensor subsystems 630, 632, and 634.

The sensor subsystems are defined as components of the hardware architecture that reside on separate power "islands." This means the power consumption of a group of sensor subsystems running concurrently is equal to the sum of the power consumptions of the individual sensor subsystems running in isolation.

If the performance metric of the ith service is denoted $f_i(r_{X_i})$, where $X_i$ denotes the subset of subsystems utilized by the ith service, and $r_j$ denotes the power of the jth subsystem, the utility function takes the form $$U(r_1, r_2, \ldots) = g(f_1(r_{X_1}), f_2(r_{X_2}), \ldots).$$

For example, if three services are running, utilizing a total of three subsystems, with the first service utilizing the first subsystem, the second utilizing all three subsystems, and the third utilizing the second and third subsystems, then the optimization problem is $$(r_1^*, r_2^*, r_3^*) =$$
$$\operatorname{argmax}_{(r_1, r_2, r_3)} w_1 \log(f_1(r_1)) + w_2 \log(f_2(r_1, r_2, r_3)) + w_3 \log(f_3(r_2, r_3)),$$

subject to $r_1 + r_2 + r_3 \ll R$.

By dynamically managing the power allocated to different context awareness services, or sensor subsystems utilized by such services, a seamless user experience is ensured where neither device battery life nor application performance is adversely affected.

Figure 7:
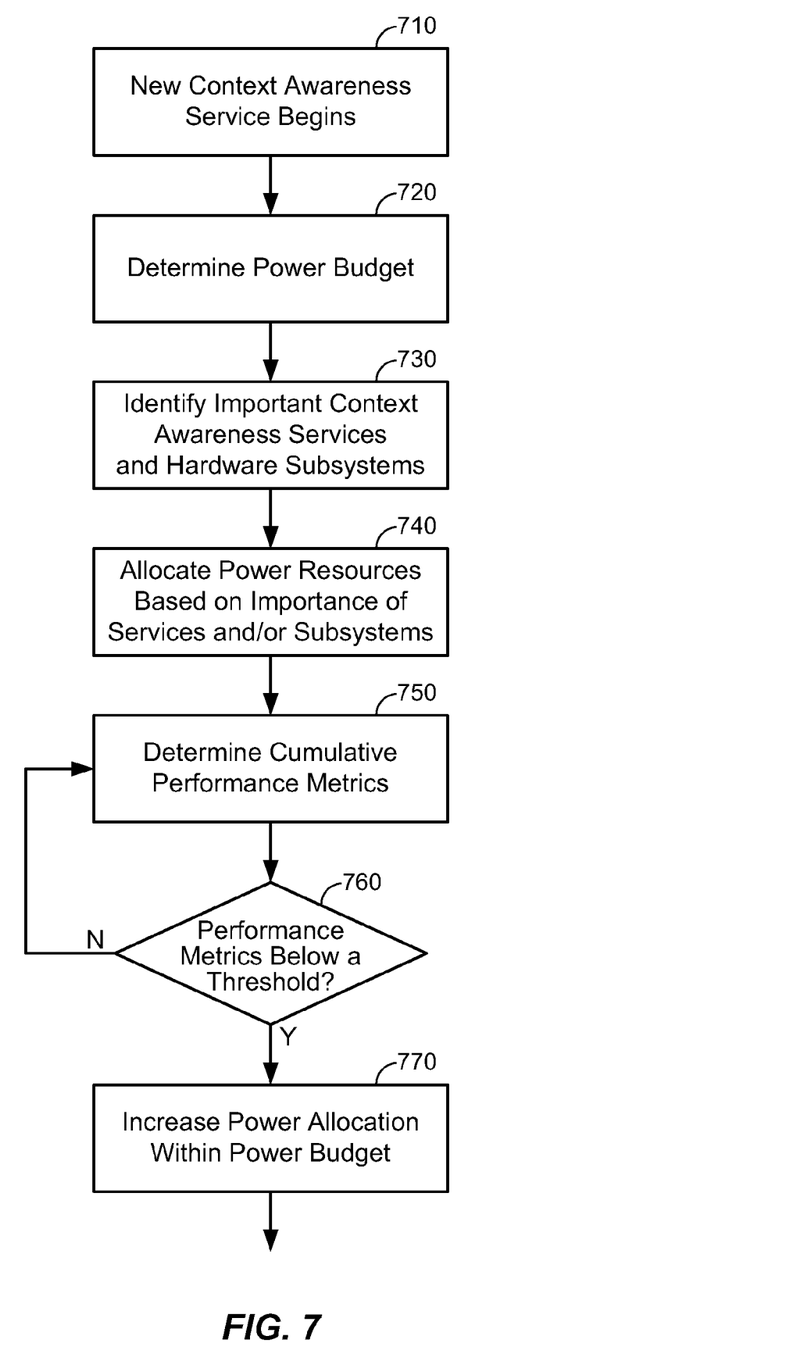
FIG. 7 illustrates an exemplary flow for modifying the power utilization of one or more hardware subsystems when a new context awareness service begins.

FIG. 7 illustrates an exemplary flow for modifying the power utilization of one or more hardware (or sensor) subsystems when a new context awareness service begins. At 710, a new context awareness service begins. At 720, a power budget for all the context awareness services running on the UE, including the new context awareness service, is determined. The power budget is based on the power requirements for each of the running context awareness services, which are based on the power utilizations of the hardware subsystems corresponding to the plurality of context awareness services. That is, the power budget must be greater than the minimum amount of power required to operate the various context awareness services and the underlying hardware subsystems, but can be less than the amount of power necessary to run the context awareness services and hardware subsystems at full power.

The power budget may be determined based on default, or preprogrammed, settings, the user's selection of a power management profile, or the battery level of the UE. The power management profile may define the amount of power resources to make available for context awareness services based on various criteria, such as the battery level of the UE, whether or not the UE is charging, whether or not the UE is connected to a wireless access network, the location of the UE, and the like.

At 730, important context awareness services and/or hardware subsystems are identified. An important context awareness service includes one that is utilized by multiple applications. The more applications that utilize a context awareness service, the greater its importance. Similarly, an important hardware subsystem includes one that is utilized by multiple context awareness services and/or by a context awareness service that is utilized by multiple applications. The greater the number of context awareness services utilizing the hardware subsystem and/or the greater the number of applications utilizing one or more context awareness services utilizing the hardware subsystem, the greater the hardware subsystem's importance.

At 740, power resources are allocated to the hardware subsystems based on their importance. For example, additional power resources are allocated to shared context awareness services and/or hardware subsystems. The allocation of the power resources is performed within the power budget. That is, the UE does not allocate more power resources to the hardware subsystems than is permitted by the power budget.

At 750, cumulative performance metrics are determined for the context awareness services. The cumulative performance metrics are a function of the performance/power trade-off of each context awareness service, as described with reference to FIG. 4. The performance metrics may be observed over time, and/or may be provided in a lookup table. The lookup table can list the preferred amount of power resources for each context awareness service and/or hardware subsystem, and/or a mapping of power resources to accuracy of the context awareness service. That is, a row in the lookup table could list a power level for the context awareness service or hardware subsystem and a corresponding accuracy of the context awareness service.

If the performance metrics are provided in a lookup table, then 750 may be performed before 740. Accordingly, at 740, the allocation of the power resources would take into consideration the performance metrics provided in the lookup table.

At 760, a determination is made as to whether or not the performance metrics for the context awareness services have fallen below a threshold. The determination may be for the cumulative performance metrics for all running context awareness services, or the performance metrics of each running context awareness service.

If, at 760, none of the performance metrics have fallen below the threshold, then the flow returns to 750. However, if the performance metrics of one or more of the context awareness services, or the cumulative performance metrics, have fallen below the threshold, then at 770, the power allocation is increased. The overall power allocation may be increased in the case of the cumulative performance metrics falling below the threshold, of the power allocation for the one or more context awareness services whose performance metrics fell below the threshold may be increased. The increase of the power allocation should, however, stay within the determined power budget.

The status of the UE can change, which can cause the determination of a new power budget. In that case, the flow would return to 720. Alternatively, a new context awareness service can begin, or a currently running one end, and the flow would return to 710.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers.

Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for dynamic power management of context aware services, comprising:
   determining a total power budget for a plurality of operating context awareness services, each of the plurality of context awareness services utilizing one or more hardware subsystems;
   determining cumulative performance metrics of at least one of the plurality of context awareness services;
   determining a utility function that relates a performance metric of each of the plurality of context awareness services to a power consumption associated with the performance metric; and
   allocating power resources, subject to the total power budget, to the plurality of operating context awareness services based on the utility function, wherein the allocating power resources includes increasing the allocation of the power resources within the total power budget if the cumulative performance metrics fall below a threshold.

2. The method of claim 1, wherein the one or more hardware subsystems comprise at least one sensor and the performance metric associated with a given context awareness service relates to an accuracy of the at least one sensor.

3. The method of claim 2, wherein the accuracy of the at least one sensor is a function of a power consumption of the at least one sensor.

4. The method of claim 1, wherein at least one of the one or more hardware subsystems comprises a plurality of sensors.

5. The method of claim 1, wherein at least one of the one or more hardware subsystems comprises a single sensor.

6. The method of claim 1, wherein at least one of the plurality of context awareness services is associated with a plurality of hardware subsystems.

7. The method of claim 1, wherein the plurality of context awareness services are one or more of a geo-fencing service, a motion classification service, a speech detection service, an in-meeting detection service, a location clustering service, or an audio clustering service.

8. The method of claim 1, wherein the one or more hardware subsystems are one or more of a motion sensor subsystem, a wireless network access subsystem, a GPS subsystem, an audio subsystem, a short-range wireless communication subsystem, or a camera subsystem.

9. The method of claim 1, wherein the determining the total power budget is based on user selection of a power management profile.

10. The method of claim 1, wherein the determining the total power budget is based on a battery level of a device comprising the one or more hardware subsystems.

11. The method of claim 1, wherein at least one of the cumulative performance metrics is an accuracy of a classifier or a detector service.

12. The method of claim 1, wherein the cumulative performance metrics are a function of a performance/power trade-off of each of the plurality of context awareness services.

13. The method of claim 1, wherein a lookup table is used in modifying operation of the plurality of context awareness services.

14. The method of claim 1, wherein a plurality of applications utilize one or more shared context awareness services of the plurality of context awareness services.

15. The method of claim 14, wherein the allocating power resources comprises allocating additional power resources to the one or more shared context awareness services.

16. The method of claim 1, wherein at least two of the plurality of context awareness services share one or more shared hardware subsystems.

17. The method of claim 16, wherein the allocating power resources comprises allocating additional power resources to the one or more shared hardware subsystems.

18. The method of claim 1, wherein the allocating power resources comprises:
   determining a number of the plurality of context awareness services using a given hardware subsystem; and
   assigning a weight to the given hardware subsystem based on the determined number of the plurality of context awareness services.

19. An apparatus for dynamic power management of context aware services, comprising:
   a processor; and
   memory coupled to the processor and configured to store data, instructions, or a combination thereof, the processor being configured to:
   determine a total power budget for a plurality of operating context awareness services, each of the plurality of context awareness services utilizing one or more hardware subsystems;
   determine cumulative performance metrics of at least one of the plurality of context awareness services;
   determine a utility function that relates a performance metric of each of the plurality of context awareness services to a power consumption associated with the performance metric; and
   allocate power resources, subject to the total power budget, to the plurality of operating context awareness services based on the utility function, wherein to allocate power resources, the processor is further configured to increase the allocation of the power resources within the total power budget if the cumulative performance metrics fall below a threshold.

20. The apparatus of claim 19, wherein the one or more hardware subsystems comprise at least one sensor and the performance metric associated with a given context awareness service relates to an accuracy of the at least one sensor.

21. The apparatus of claim 20, wherein the accuracy of the at least one sensor is a function of a power consumption of the at least one sensor.

22. The apparatus of claim 19, wherein at least one of the one or more hardware subsystems comprises a plurality of sensors.

23. The apparatus of claim 19, wherein at least one of the one or more hardware subsystems comprises a single sensor.

24. The apparatus of claim 19, wherein at least one of the plurality of context awareness services is associated with a plurality of hardware subsystems.

25. The apparatus of claim 19, wherein the plurality of context awareness services are one or more of a geo-fencing service, a motion classification service, a speech detection service, an in-meeting detection service, a location clustering service, or an audio clustering service.

26. The apparatus of claim 19, wherein the one or more hardware subsystems are one or more of a motion sensor subsystem, a wireless network access subsystem, a GPS subsystem, an audio subsystem, a short-range wireless communication subsystem, or a camera subsystem.

27. The apparatus of claim 19, wherein determining the total power budget is based on user selection of a power management profile.

28. The apparatus of claim 19, wherein determining the total power budget is based on a battery level of a device comprising the one or more hardware subsystems.

29. The apparatus of claim 19, wherein at least one of the cumulative performance metrics is an accuracy of a classifier or a detector service.

30. The apparatus of claim 19, wherein the cumulative performance metrics are a function of a performance/power trade-off of each of the plurality of context awareness services.

31. The apparatus of claim 19, wherein a lookup table is used in modifying operation of the plurality of context awareness services.

32. The apparatus of claim 19, wherein a plurality of applications utilize one or more shared context awareness services of the plurality of context awareness services.

33. The apparatus of claim 32, wherein to allocate power resources, the processor is further configured to allocate additional power resources to the one or more shared context awareness services.

34. The apparatus of claim 19, wherein at least two of the plurality of context awareness services share one or more shared hardware subsystems.

35. The apparatus of claim 34, wherein to allocate power resources, the processor is further configured to allocate additional power resources to the one or more shared hardware subsystems.

36. The apparatus of claim 19, wherein to allocate power resources, the processor is further configured to:
   determine a number of the plurality of context awareness services using a given hardware subsystem; and
   assign a weight to the given hardware subsystem based on the determined number of the plurality of context awareness services.

37. An apparatus for dynamic power management of context aware services, comprising:
   means for determining a total power budget for a plurality of operating context awareness services, each of the plurality of context awareness services utilizing one or more hardware subsystems;
   means for determining cumulative performance metrics of at least one of the plurality of context awareness services;
   means for determining a utility function that relates a performance metric of each of the plurality of context awareness services to a power consumption associated with the performance metric; and
   means for allocating power resources, subject to the total power budget, to the plurality of operating context awareness services based on the utility function, wherein the allocating power resources includes increasing the allocation of the power resources within the total power budget if the cumulative performance metrics fall below a threshold.

38. A non-transitory computer-readable medium comprising program code for dynamic power management of context aware services, the program code comprising:
   at least one instruction to determine a total power budget for a plurality of operating context awareness services, each of the plurality of context awareness services utilizing one or more hardware subsystems;
   at least one instruction for determining cumulative performance metrics of at least one of the plurality of context awareness services;
   at least one instruction to determine a utility function that relates a performance metric of each of the plurality of context awareness services to a power consumption associated with the performance metric; and
   at least one instruction to allocate power resources, subject to the total power budget, to the plurality of operating context awareness services based on the utility function, wherein the allocating power resources includes increasing the allocation of the power resources within the total power budget if the cumulative performance metrics fall below a threshold.

39. A method for dynamic power management of context aware services, comprising:
   determining a total power budget for a plurality of operating context awareness services, each of the plurality of context awareness services utilizing a plurality of corresponding hardware subsystems;
   determining cumulative performance metrics of at least one of the plurality of context awareness services;
   determining a utility function that, for each of the plurality of context awareness services, relates a performance metric of the context awareness service to a power consumption of the plurality of corresponding hardware subsystems associated with the performance metric; and
   allocating power resources, subject to the total power budget, to the plurality of operating context awareness services based on the utility function, wherein the allocating power resources includes increasing the allocation of the power resources within the total power budget if the cumulative performance metrics fall below a threshold.

* * * * *